(12) United States Patent
Miyamoto

(10) Patent No.: US 7,654,070 B2
(45) Date of Patent: Feb. 2, 2010

(54) MOWN-GROSS COLLECTING BUCKET

(75) Inventor: Yasuhiko Miyamoto, Saitama (JP)

(73) Assignee: Cosmo EC Co., Ltd., Tokyo (JP)

( * ) Notice: Subject to any disclaimer, the term of this patent is extended or adjusted under 35 U.S.C. 154(b) by 206 days.

(21) Appl. No.: 11/964,746

(22) Filed: Dec. 27, 2007

(65) Prior Publication Data
US 2008/0155956 A1 Jul. 3, 2008

(30) Foreign Application Priority Data
Dec. 28, 2006 (JP) .............................. 2006-355380

(51) Int. Cl.
*A01D 43/06* (2006.01)
(52) U.S. Cl. ...................................................... 56/202
(58) Field of Classification Search .................. 56/7, 56/198–200, 203, 204, 249, 294, 320.2, 194, 56/205, 206; 232/65; 15/82, 83
See application file for complete search history.

(56) References Cited
U.S. PATENT DOCUMENTS

| | | | | | |
|---|---|---|---|---|---|
| 4,459,719 | A | * | 7/1984 | Notestine ...................... | 15/349 |
| 5,070,683 | A | * | 12/1991 | Eggenmueller ............. | 56/13.8 |
| 5,934,056 | A | * | 8/1999 | McMurtry et al. ............ | 56/203 |

FOREIGN PATENT DOCUMENTS

| JP | 2001-269035 | 10/2001 |
|---|---|---|
| JP | 2002-065019 | 3/2002 |
| JP | 2003-235320 | 8/2003 |
| JP | 2004-000265 | 1/2004 |
| JP | 2006-094851 | 4/2006 |

* cited by examiner

*Primary Examiner*—Thomas B Will
*Assistant Examiner*—Mai T Nguyen
(74) *Attorney, Agent, or Firm*—Dennis G. LaPointe

(57) ABSTRACT

A mown-grass collecting bucket capable of smoothly collecting into a mown-grass collecting box the grass mown off by a lawn mower cutters and automatically discharging out of the box the mown grass collected into the box and scraped together is provided. The mown-grass collecting box having intake and discharge ports for the mown grass is provided with a mown-grass scraping-together and discharging mechanism, which mechanism comprising a rotary shaft coupled to a rotary drive source to be driven thereby, a first blade supported through first brackets by the rotary shaft, a second blade supported through second brackets mounted to support shafts provided on the first brackets, a brush provided to tip edge of the second blade, and twist springs each mounted on each support shaft and across each first bracket and each second bracket.

4 Claims, 18 Drawing Sheets

MOWN-GROSS COLLECTING BUCKET

BACKGROUND OF THE INVENTION

1. Field of the Invention

This invention relates to a mown-grass collecting bucket for use as mounted to lawn mowers and, more particularly, to a mown-grass collecting bucket optimum for discharging automatically the grass mown and collected in the bucket.

2. Background of Related Art

The lawn mowers mainly for use on greens in golf courses have been used mostly with the mown-grass collecting bucket mounted to the mowers, due to that the mown grass cannot be left on the green's surface.

It has been necessary for these mowers in which the mown-grass collecting bucket is filled up with the mown grass to dismount the bucket from body structure of the mower and to manually discharge the mown grass out of the bucket.

Generally, the mown-grass collecting bucket weighs about 1.5 to 2.0 kg and the weight reaches about 2.5 to 3.0 kg while it depends on conditions how much the mown grass is wet or moistened. When a larger amount of the mown grass is collected in the bucket and its weight gets larger as a whole, the lawn mower is caused to lean down on the side where the bucket is mounted so as to give an influence on the distance between mowing cutters and the surface of the lawn, so that, in such season as summer in which the lawn grows faster, the mown grass collected in the bucket will have to be discharged quite often, and operators of the lawn mowers are forced to attend to such heavy work.

Various proposals have been made for providing the lawn mower, which is capable of relieving the operator from such heavy work by allowing the mown and collected grass in the bucket to be automatically discharged at a site therefor.

In a grass discharge device or lawn mower disclosed in, for example, Japanese Laid-Open Patent Publication No. 2001-269035, an intake path for the mown grass and including a blower disposed lower part of the mower is changed over to a discharge path from the lower part of grass collecting bucket through the same blower to a high positioned discharge port, in order to have the collected grass discharged while causing stacked grass in the bottom of the bucket to be loosened with an agitator rotated for easier sucking discharge by the blower.

In the case of a grass collecting bucket of lawn mower according to a Japanese Laid-Open Patent Publication No. 2002-65019, the mown grass is carried into the bucket by means of rotating wind of cutter blades, a bottom wall plate of the bucket box-shaped is hinged at its discharge port side edge to allow the other side edge rotated with pressure cylinders so as to compress the collected grass toward the discharge port. In discharging the collected grass, the bucket is lifted with further pressure cylinders and with the discharge port side disposed down, and the port is opened to cause the compressed grass to fall out.

Further, there is disclosed in a Japanese Laid-Open Patent Publication No. 2003-235320 a set of multiple reel mowers, which is provided with mown grass collecting function by mounting a suction cover to respective mowers, connecting discharge ports of these covers through ducts to a suction port of each of blowers disposed on both sides of the operator's seat, and connecting discharge ports of the blowers through ducts to upward opening of a hopper mounted behind the operator's seat, the hopper being tilted with front side lifted by means of cylinders while opening rear side lid for discharging collected mown grass.

In another Japanese Laid-Open Patent Publication No. 2004-265, further, a mown grass discharging device comprises a grass discharge path starting at opposing position of parallel cutter disks rotating in opposite directions and leading through upward blower to a high-position entrance of grass collecting case openable downward, the path having at the starting a slidable bottom plate for allowing any clogging grass discharged downward.

In the case of the foregoing first publication, the discharge of the collected grass from the bottom of the grass collecting bucket to the higher positioned discharge port relies on a suction force of the blower, and there is a risk that the discharge is insufficient while there is provided means for agitating the grass stacked in the bucket. In remaining other cases, too, air stream of the rotating wind of the cutter disks or of the suction force of the blower is employed for carrying the mown grass over a rather long distance from the front side on which the mowing cutter blades are desirably disposed up to the rear upper side on the grass collecting bucket is generally loaded in the mower, and it is required to chose a blower of a larger size or power for sufficient and complete discharge of the mown and collected grass. Further, the grass collecting bucket of a larger size requires the pressure cylinders for the tilting or elevating operation of the bucket, so that the lawn mower will have to be larger in size and complicate in the structure.

SUMMARY OF THE INVENTION

The present invention has been suggested in view of the foregoing circumstances, and its object is to provide a mown-grass collecting bucket capable of effectively smoothly collecting the grass mown with mowing cutters into the bucket, and of automatically discharging the collected grass out of the bucket with the grass scattering in the bucket effectively scraped together for the discharge.

Another object of the present invention is to provide a mown-grass collecting bucket permitting first and second grass-gathering blades to be adequately controlled with a rotary shaft that carries the blades controlled in rev-count at a predetermined count.

Still another object of the present invention is to provide a mown-grass collecting bucket which can stop any mown grass tending to jump out of an intake port of the bucket, even when the grass inside the bucket is hit by the second blade to fly towards the intake port, in the event where the first and second blades are moving from the discharge port to the intake port.

Still further object of the present invention is to provide a mown-grass collecting bucket capable of discharging positively the collected grass which tends to stay around the discharge and intake ports.

DETAILED DESCRIPTION OF THE PREFERRED EMBODIMENT

Figure 1:
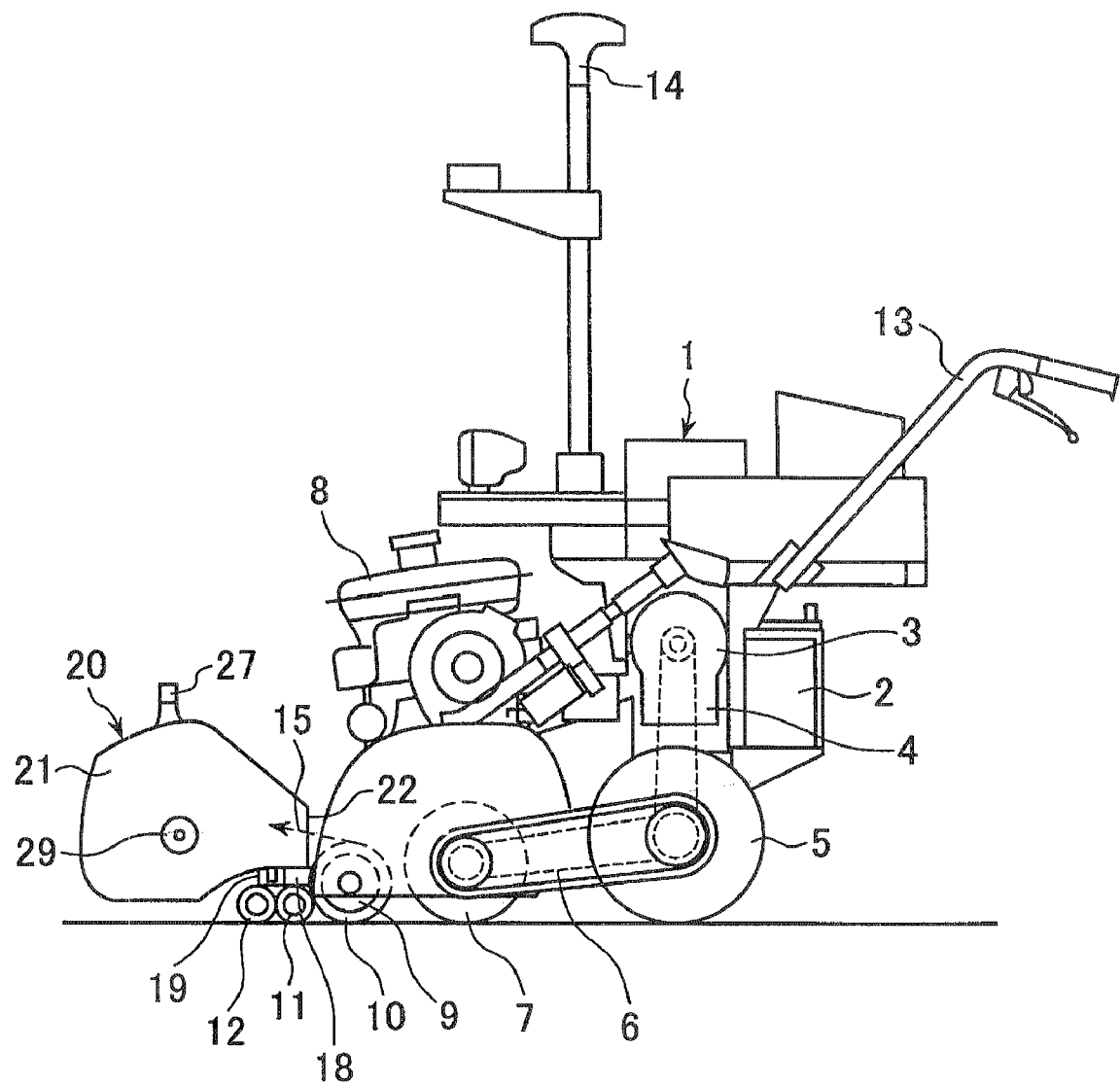
FIG. 1 shows a side elevation of an automatic lawn mower with a mown-grass collecting bucket according to Embodiment 1 of the present invention in use as mounted to the mower.

In order to achieve the foregoing objects, a mown-grass collecting bucket 20 according to the present invention is formed such that a hollow mown-grass collecting box 21 is provided at a position opposing to a cutter side of a lawn mower with a mown-grass intake port 22 and at a lower portion of the box 21 with a mown-grass discharge port 26, and there is provided in the mown-grass collecting box 21 a mown-grass collecting and discharging mechanism for closing the discharge port 26 when the mown grass is collected into the collecting box 21 with first and second blades 31, 34 kept open in a mountain-shape by means of a rotary shaft 28 linked with a rotary drive source 29 to be driven thereby, the first blade 31 mounted through a pair of first brackets 32 to the rotary shaft 28 for integral rotation therewith, the second blade 34 supported through a pair of second brackets 35 bar support shafts 33 to be rotatable thereabout and having at tip edge a brush 36, the support shafts 33 being provided on the first brackets 32, and twist springs 40 mounted on the support shafts 33 and across the first and second brackets 32 and 35; and for opening the discharge port 26 when the mown grass is discharged while the first and second blades 31, 34 are rotating and moving from the discharge port 26 through the intake port 22 back to the discharge port 26, with the brush 36 at the tip edge of the second blade 34 made to scrape together the mown grass within the box 21 to lead it to the position of the discharge port 26 opened for discharging the grass thereout.

Also for achieving the foregoing objects, according to the present invention, a rotary drive source control circuit is constituted such that the rotary shaft 28 is provided with a non-contacting type rev-count sensor means 41, which sensor means 41 is connected to a controller 45 connected to the rotary drive source 29 of the rotary shaft 28, so that, when the rev-count of the rotary shaft 28 as sensed by the rev-count sensor means 41 has reached a count preliminarily set in the controller 45, the rotary drive source 29 is stopped.

Also for achieving the foregoing objects, according to the present invention, a stop plate 48 for jumping up grass is provided at a lower position inside the mown grass intake port 22, the stop plate 48 is supported rotatably to side walls of the grass intake port 22 through pivot shafts 49, 50, and the stop plate 48 is linked to an operating means 51 provided between the rotary shaft 28 and one pivot shaft 50 for causing the stop plate 48 to lie down substantially horizontally when the mown grass is collected into the mown-grass collecting box 21, and for causing the stop plate 48 to be erected at an angle capable of stopping any jumping up grass when the second blade 34 rotates to move from the discharge port 26 towards the intake port 22 at the time of discharging the mown grass.

Further for achieving the foregoing objects, according to the present invention, a discharge hole 61 is provided at a position corresponding to the stop plate 48 at the lower position of the grass intake port 22, for the grass falling down as stopped by the stop plate 48.

According to the present invention, the mown-grass intake port 22 is provided to the mown-grass collecting box 21 at its position where the box opposing the mowing cutters of the lawn mower, and the grass discharge port 26 is closed by means of the first and second blades 31, 34 kept open in the mountain shape, so that there is shown an effect that the morn grass sent as flown from the cutters of the lawn mower can be collected in smooth manner through the intake port 22 for housing in the mown-grass collecting box 21. Further according to the present invention, as the brush 36 provided to the tip edge of the second blade 34 is caused to frictionally contact with the inner wall of the mown-grass collecting box 21 so as to scrape off any grass sticking to the inner wall of the box 21 to lead it towards the discharge port 26 and to have it discharged out of the port 26 to the exterior, there is shown an effect that the mown grass collected into the box 21 can be automatically discharged out of the box 21.

Further according to the present invention, the rev-count of the rotary shaft 28 is detected by the non-contact type rev-count sensor means 41 and is transmitted to the controller 45 when the collected mown grass is discharged, the stop signal is provided to the rotary drive source 29 when the rev-count has reached a predetermined count in the controller 45, to have the rotation of the rotary shaft 28 stopped, so that the first and second blades 31, 34 attached to the rotary shaft 28 will cease their rotation and movement, whereby there is shown such effect that the mown grass within the collecting box 21 can be discharged neatly and effectively with the first and second blades 31, 34 properly controlled.

Further according to the present invention, as the stop plate 48 against the jumping up mown grass is disposed below the mown-grass intake port 22, such that the stop plate 48 is rotatably supported by side walls of the intake port 22 through the pivot shafts 49, 50 so that, in discharging the mown grass, the stop plate 48 will be erected to an angle capable of receiving the jumping up grass by the operating means 51 for the stop plate while the second blade 34 is rotating and moving from the grass discharge port 26 towards the intake port 22 and the mown grass hit by the brush 36 provided at the tip edge of the second blade 34 will be received, there is shown an effect that any trouble of allotting the hit mown grass by the brush 36 between the discharge port 26 and the intake port 22 to fly out of the intake port 22 can be prevented from occurring.

Further according to the present invention, as the discharge hole 61 for the mown grass falling down as received by the stop plate 48 is provided at the position corresponding to the stop plate 48 below the intake port 22, there is shown an effect that even the mown grass tending to stay around the discharge port 26 and the intake port 22 can be positively discharged through the discharge hole 61.

Referring now to embodiments of the present invention as shown in the drawings:

FIG. 1 shows in a side elevation the mown-grass collecting bucket in Embodiment 1 of the present invention, the bucket being in use as mounted to an automatic lawn mower.

The automatic lawn mower 1 shown in FIG. 1 comprises a battery 2, a running motor 3, running wheels 5 linked through a wound-around transmission member 4 to the motor, a rear roller 7, an engine 8, cutters 9 of a real type having outer peripheral blades 10, a grooming 11, a front roller 12, an operating handle 13, a GPS antenna 14 and a mounting base 18 for the mown-grass collecting box mounted on the side of the grooming 11.

This automatic lawn mower 1 is made to run such that the running wheels 5 are rotated through the wound-around transmission member 4 by means of the running motor 3 driven as powered by the battery 2, and then the rear roller 7 is rotated as linked through a wound-around transmission member 6 to the running wheels 5.

Further, with the engine 8 driven, the reel type cutters 9 are rotated through a wound around transmission member (not shown) and the lawn is mown with the blades 10 of this cutters 9. The mown grass is flown by the centrifugal force of the cutter 9 in a direction frontward as shown by an arrow 15 in FIG. 1.

Figure 2:
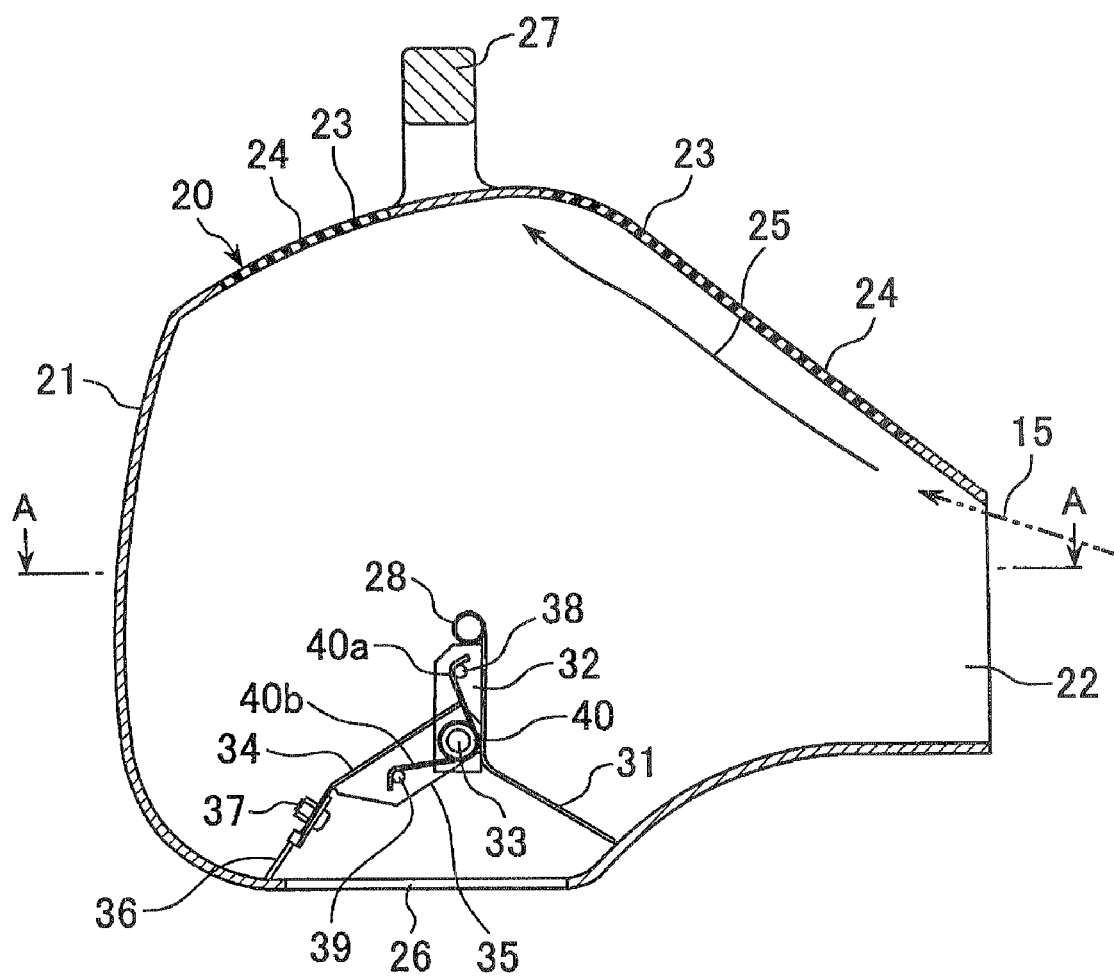
FIG. 2 shows a vertically sectioned side view of the bucket in Embodiment 1 of the present invention.
Figure 3:
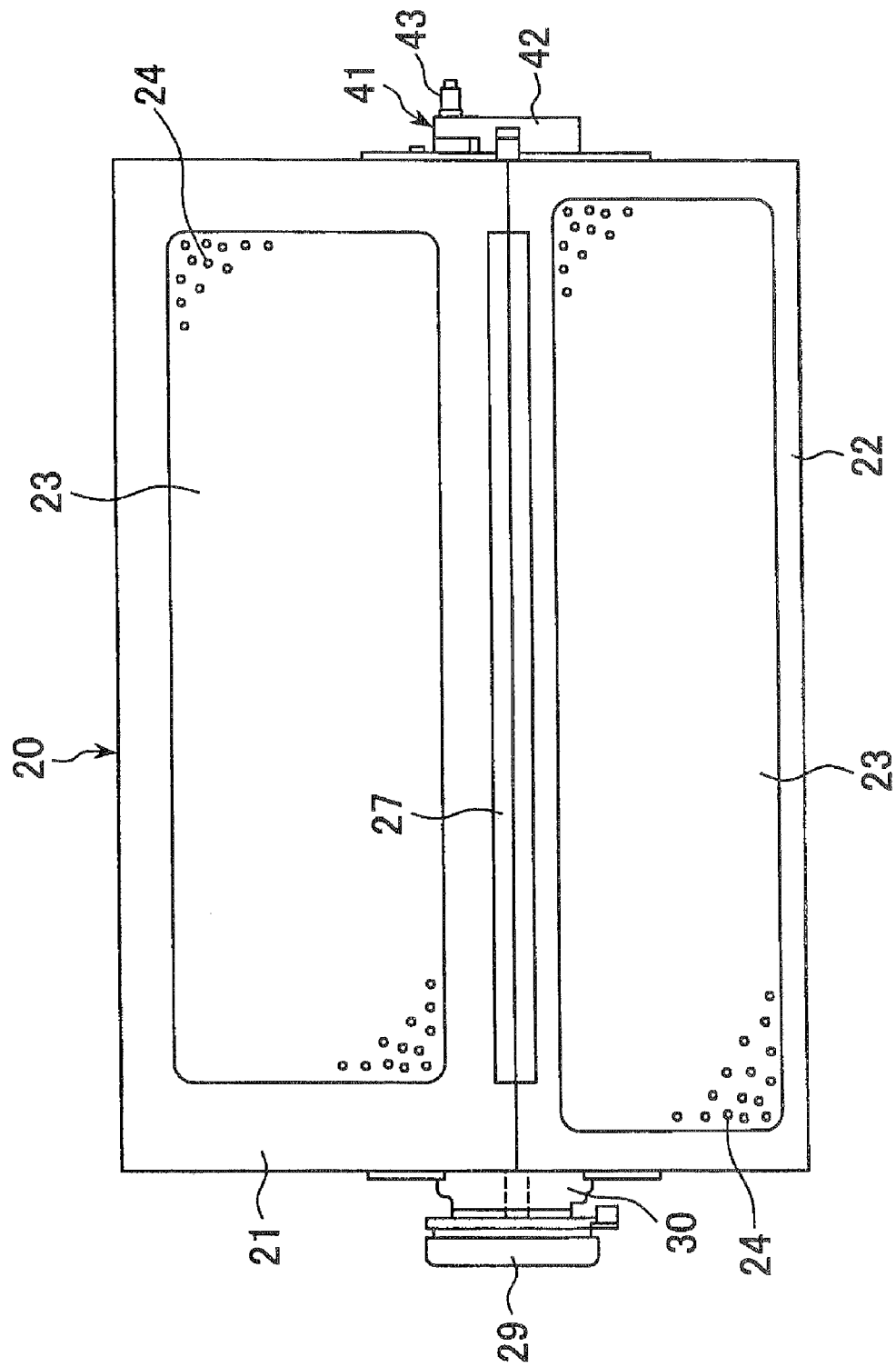
FIG. 3 shows a plan view of the bucket in Embodiment 1.
Figure 4:
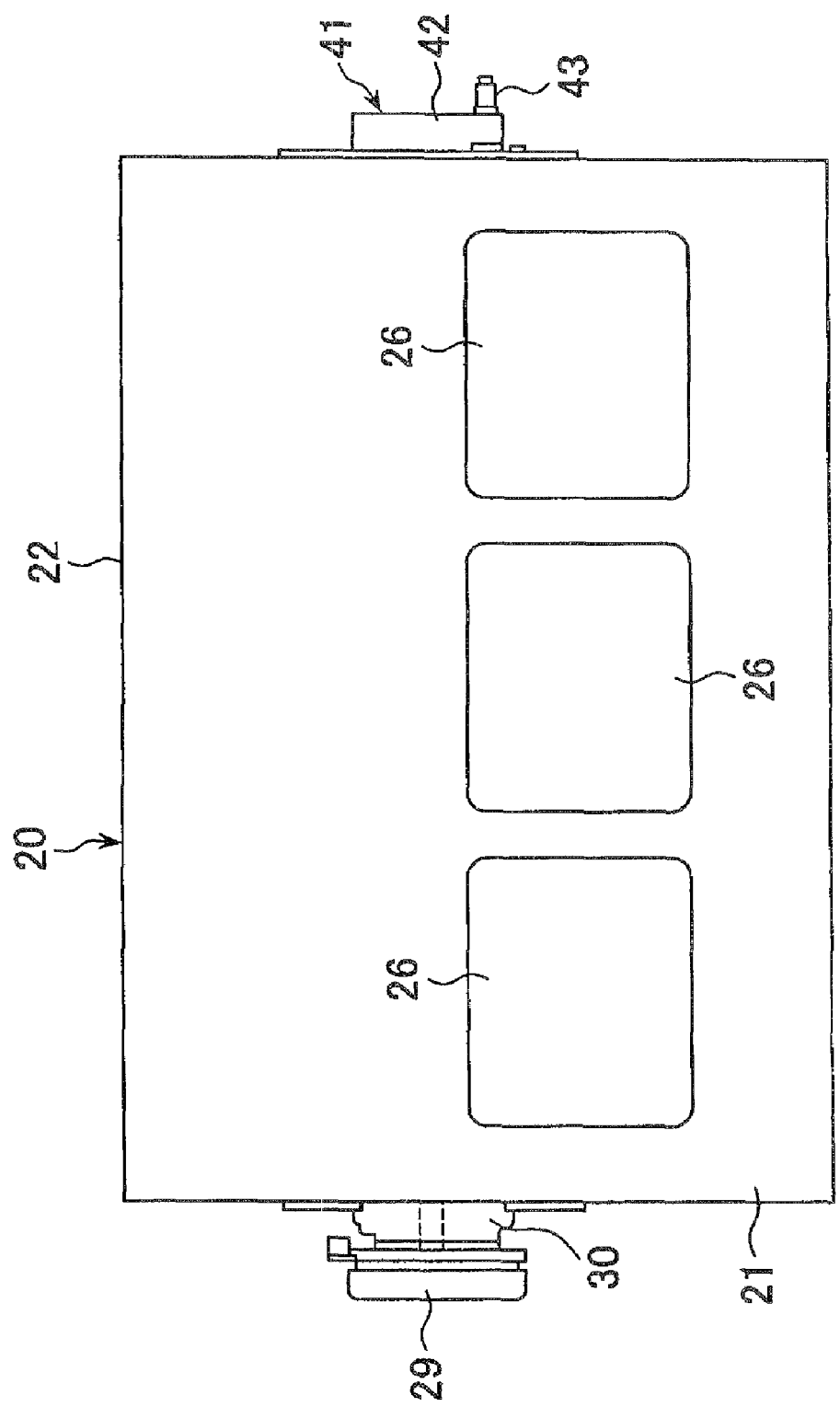
FIG. 4 shows a bottom view of the bucket in Embodiment 1.
Figure 5:
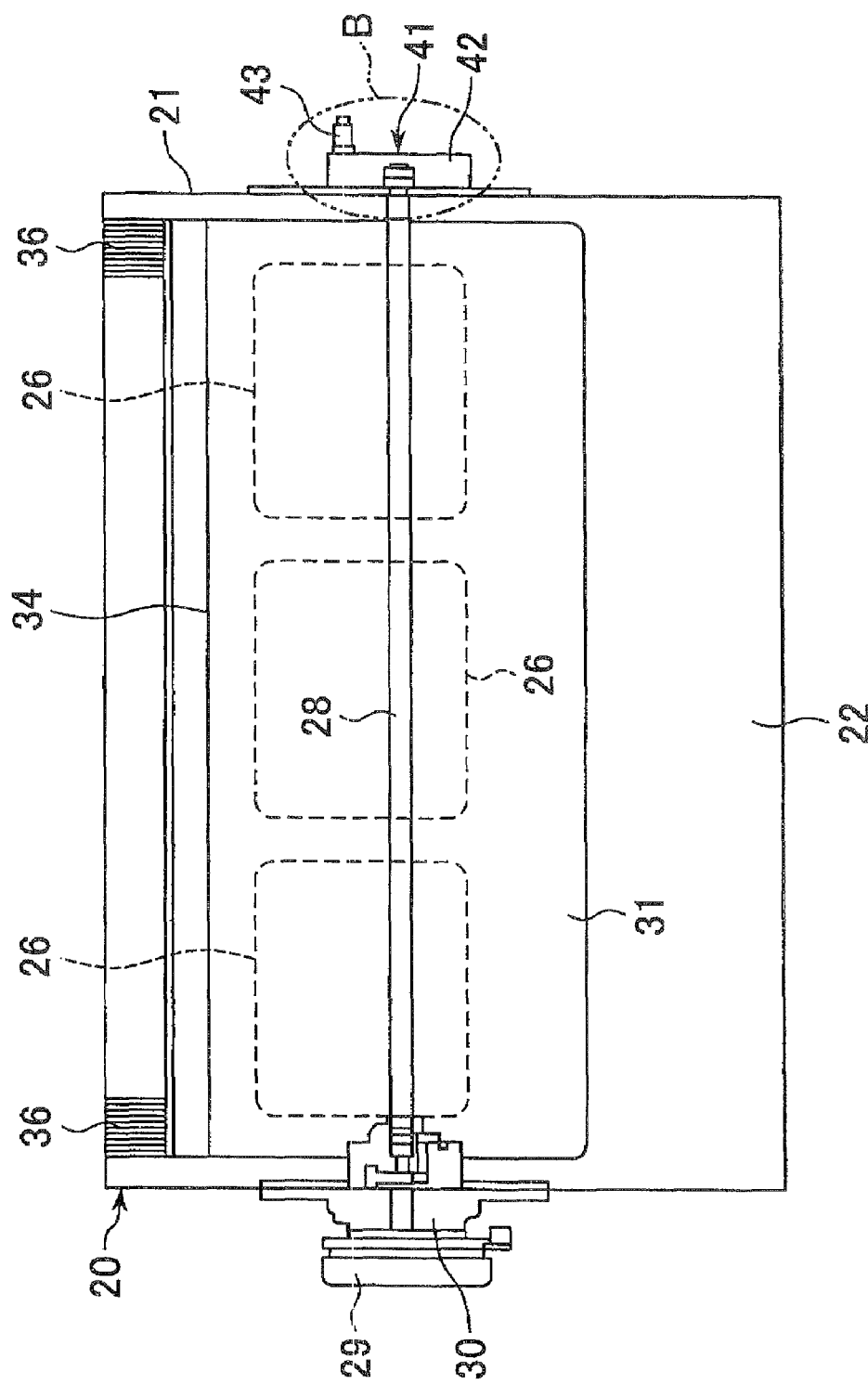
FIG. 5 shows a cross-sectional view along a line A-A shown in FIG. 2.
Figure 6:
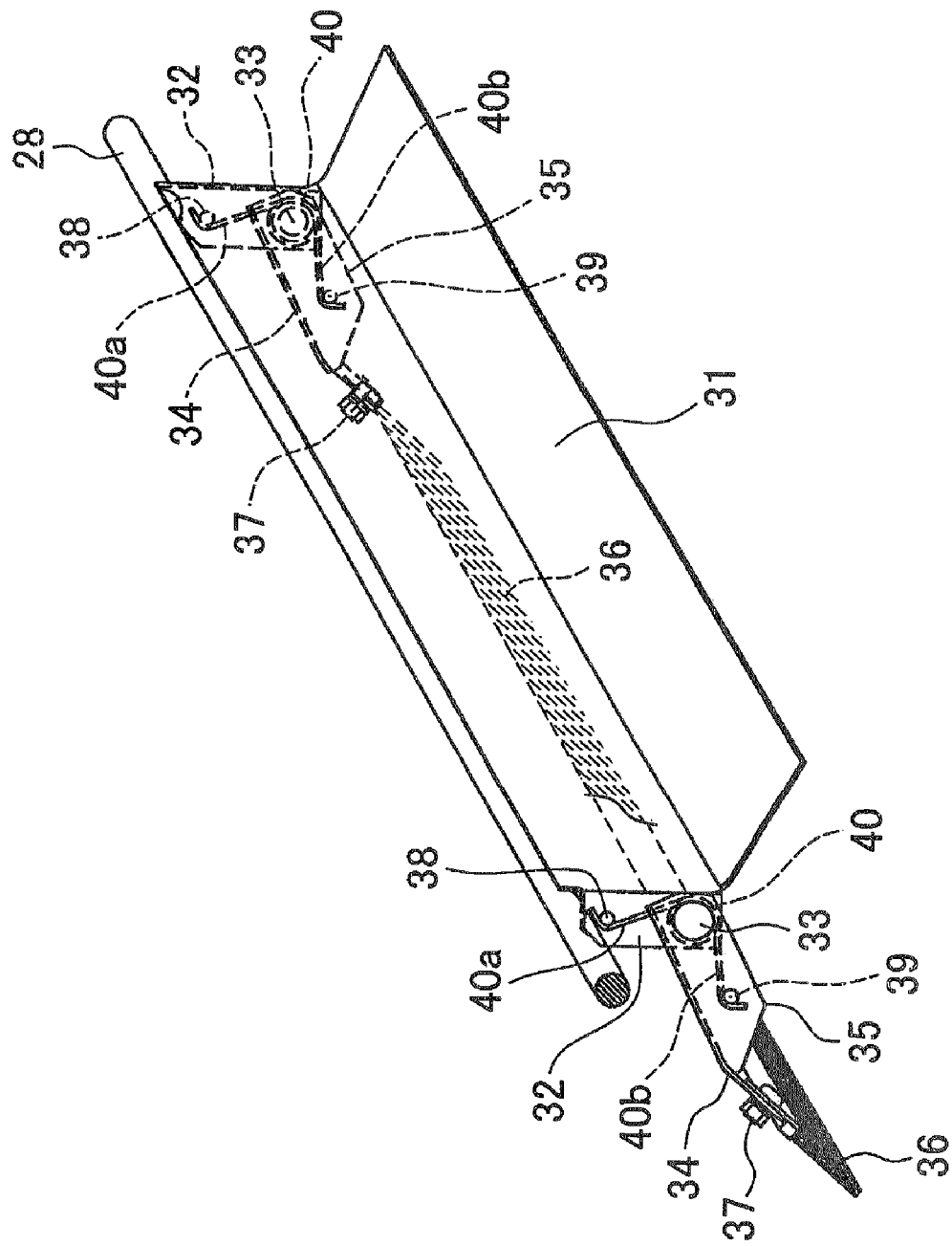
FIG. 6 shows a perspective view as magnified of the first and second blades in Embodiment 1.
Figure 7:
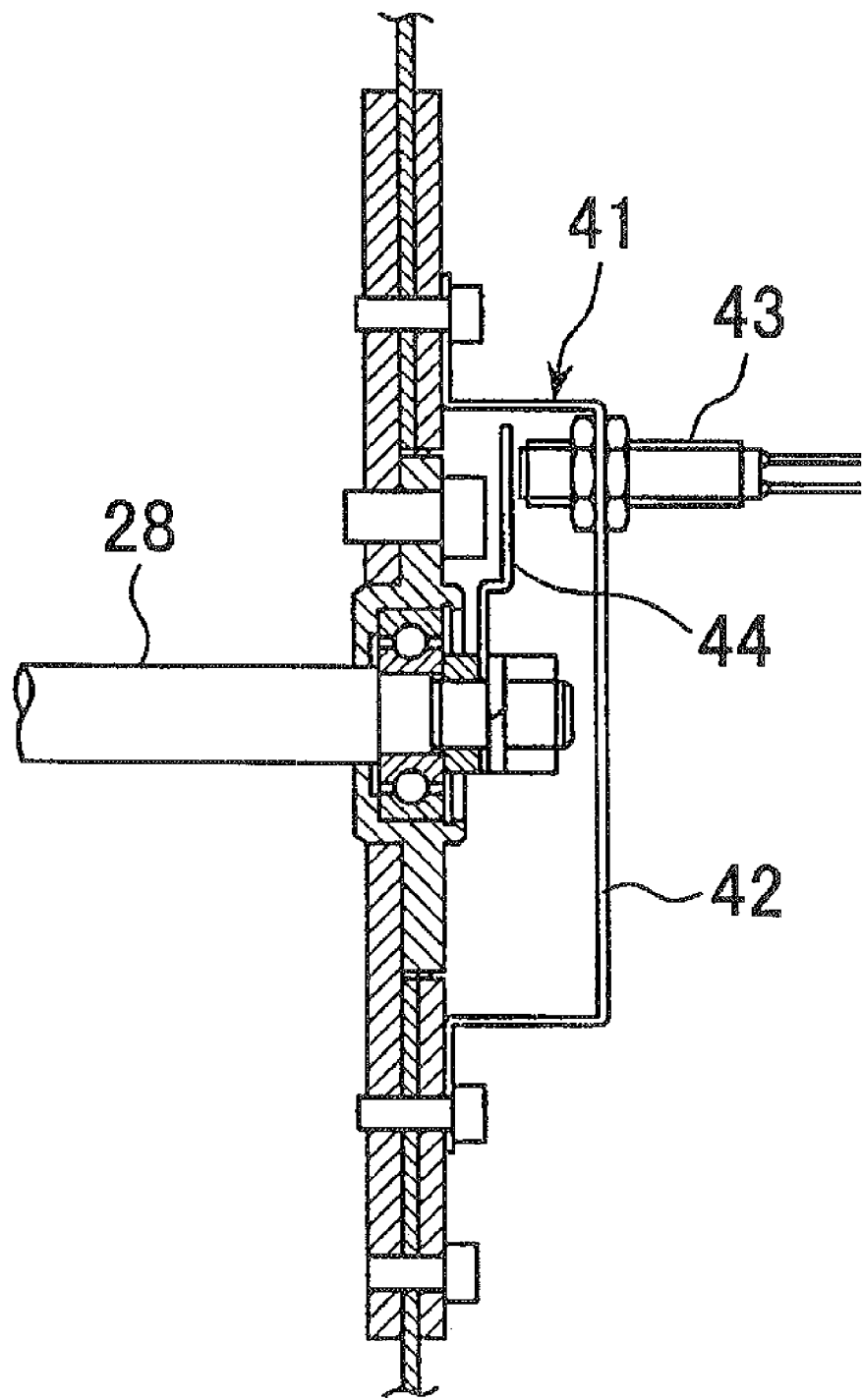
FIG. 7 is a fragmental sectional view as magnified at a portion encircled by B in FIG. 5.
Figure 8:
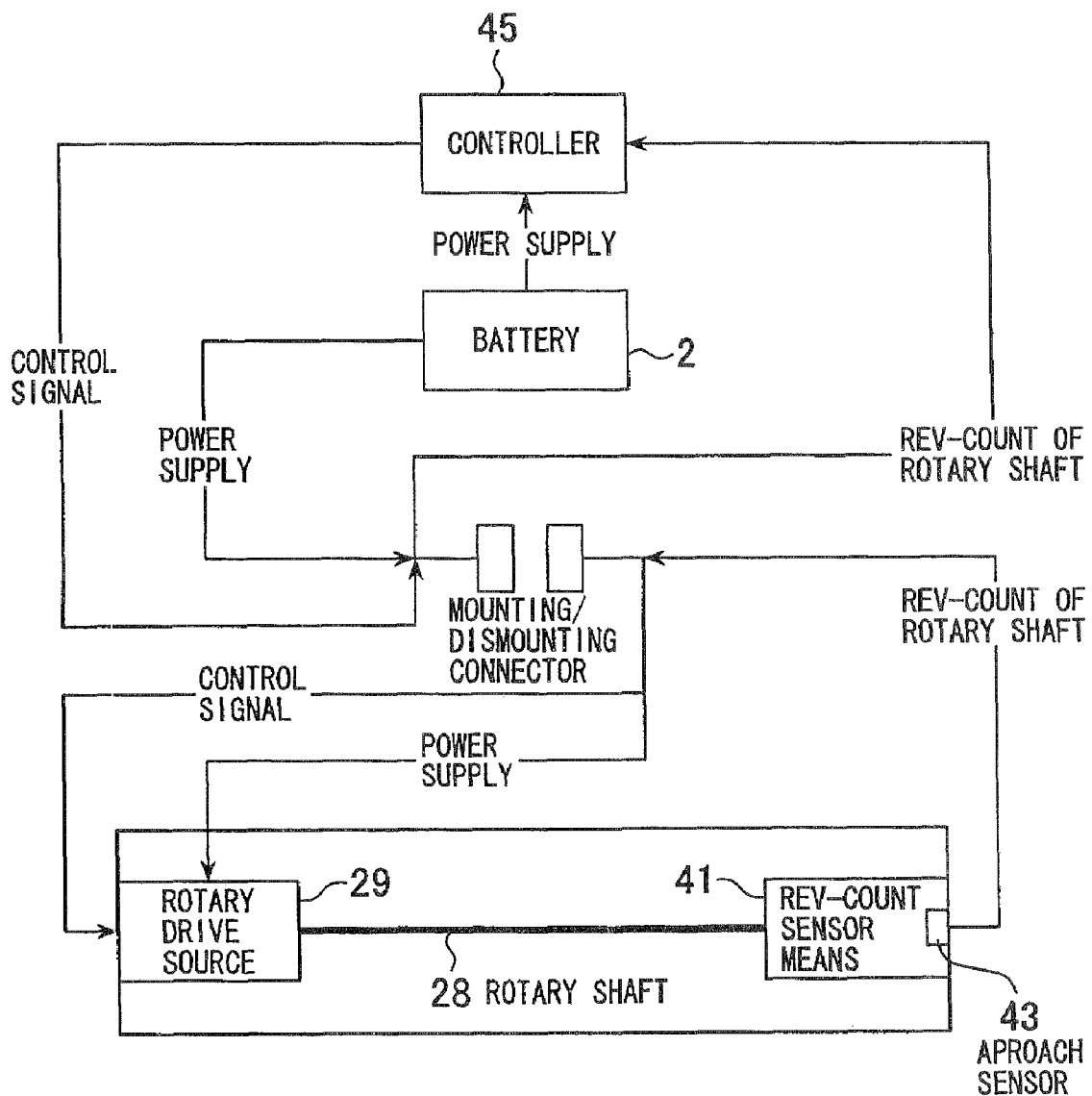
FIG. 8 is a block diagram of a control circuit of a rotary drive source for the rotary shaft in Embodiment 1.

In FIGS. 2 to 8, the mown-grass collecting bucket in Embodiment 1 according to the present invention is shown, in which FIG. 2 is a vertically sectioned side view of the bucket, FIG. 3 is a plan view of the mown-grass collecting box, FIG. 4 is a bottom view of the box, FIG. 5 is a cross-sectional view along line A-A in FIG. 2 of the bucket, FIG. 6 is a perspective view as magnified of the first and second blades, FIG. 7 is a fragmentary sectioned view as magnified of a portion shown by a circle B in FIG. 5, and FIG. 8 is a block diagram showing a control circuit of the rotary drive source for the rotors shaft.

The mown-grass collecting bucket 20 in the embodiment shown in FIGS. 2 to 8 comprises the mown-grass collecting box 21 which is oblong and hollow.

The mown-grass collecting box 21 is provided, as seen in FIG. 2, with the intake port 22 for the mown grass, windows 23 acting as an air flow path, the discharge port 26 for the mown grass, and a grip 27.

The mown grass intake port 22 is provided as seen FIG. 1 at a position opposing the lawn mower cutters 9.

The windows 23 are provided as divided into a plurality of portions as shown in FIGS. 2 and 3 on upper side of peripheral wall, as spaced mutually by a required distance. To the respective windows 23 a wire net or a perforated metal plate 24 is mounted. With the provision of these windows 23, as shown in FIG. 2, there is formed an air flow path 25 passing from the mown-grass intake port 22 through the interior of the box 2 and windows 23 to the exterior of the box 21.

The mown-grass discharge port 26 is provided as divided into a plurality of portions mutually spaced by a required distance in a lower part of the mown-grass collecting box 21, as shown in FIGS. 2 and 4.

In the mown-grass collecting box 21, a rotary shaft 28 is provided. This rotary shaft 28 is disposed in lengthwise direction in the interior of the mown-grass collecting box 21 as shown in FIG. 5, and is rotatably supported through bearings provided on the side walls of the box 21. Further, as shown in FIG. 5, this rotary shaft 28 is linked to the rotary driving source 29 to be driven thereby, the source 29 being mounted to one outer side part of the mown-grass collecting box 21. For the rotary drive source 29, a flat motor is employed in this embodiment. Further, this rotary drive source 29 is supplied with a power from the battery 2 shown in FIG. 1, and the rotary shaft 28 is linked through a reduction means 30 to the rotary drive source 29, as shown in FIG. 5.

In the interior of the mown-grass collecting box 21, the first blade 31 is mounted through the first brackets 32 in pair to the rotary shaft 28. This first blade 31 is formed substantially in L-shape, as seen in FIGS. 2 and 6. The first brackets 32 are formed by folding both longitudinal ends of the first blade 31 and are secured to the rotary shaft 28 by means of welding or the like. Therefore, the first blade 31 is made to be rotatable in integral manner with the rotary shaft 28 through the first brackets 32.

The first brackets 32 in pair are respectively provided with a support shaft 33 and a locking pin 38 for an end of a twist spring. The support shaft 33 is fixed to an outer surface on a free end side of each first bracket 32. The locking pin 38 for the one end of the twist spring is fixed to the outer surface on the fixed end side of each first bracket 32.

The support shafts 33 provided to the first brackets 32 rotatably support, as will be understood from FIGS. 2 and 6, the second blade 34 through the second brackets 35 in pair. This second blade 34 is formed substantially in a shallow-angled L-shape. The second brackets 35 in pair are formed by folding both longitudinal ends of the second blade 34. The second brackets 35 are respectively provided with a locking pin 39 for the other end of the twist spring. The locking pin 39 for the other end of the twist spring is provided on inner side of free end side of each second bracket 35, as spaced from the support shaft 33 substantially by the same distance as that between the support shaft 33 and the locking pin 38 for the one end of the twist spring.

To a tip edge of the second blade 34, the brush 36 is mounted through bolts and nuts used as a fixing means 37, as shown in FIGS. 2, 5 and 6.

The twist springs 40 in pair are respectively mounted on each support shaft 33 and across the locking pin 38 on each first bracket 32 for the one end of the twist spring and the locking pin 39 on each second bracket 35 for the other end of the spring. More specifically, center coil part of each twist spring 40 is mounted on outer periphery of the support shaft 33, one end 40a extended from the coil part is locked to the one end locking pin 38 provided to each first bracket 32, and the other end 40b extended from the coil part is locked to the other end locking pin 39 provided to each second bracket 35. With an action of thus mounted twist springs 40, the first and second blades 31, 34 are set in a state where the blades are opened at a predetermined angle, whereas, when the brush 36 provided to the second blade 34 comes in contact with the inner wall of the mown-grass collecting box 21 to cause a friction to arise, the second blade 34 moves as delayed with respect to the movement of the first blade 31 against the resiliency of the spring 40 and depending on the magnitude of friction, and the angle between the first and second blades 31 and 34 is caused to be expanded to be larger.

According to the present embodiment, the mown-grass collecting arrangement is attained such that the first and second blades 31, 34 in open state of the mountain shape are made to close the mown-grass discharge port 26 and to allow the mown grass to be collected into the box 21 from the intake port 22, by means of the rotary shaft 28, the first blade 31 mounted to the rotary shaft 28 for integral rotation therewith through the first brackets 32, the second blade 34 supported by the support shafts 33 on both first brackets 32 to be rotatable about the support shafts 33 and having the brush 36 at the tip edge, and the twist springs 40 mounted on the support shafts 33 and across the first and second brackets 32 and 35, whereas, in discharging the mown and collected grass, the grass gathering and discharging arrangement is attained such that the brush 36 provided to the second blade 34 contacts frictionally with the inner wall of the mown-grass collecting box 21 to gather the grass within the box 21 and to lead the grass to the side of the discharge port 26 while the first and second blades 31, 34 move from the discharge port 26 through the intake port 22 towards the discharge port 26, and the mown grass is discharged out of the discharge port 26 to the exterior of the mown-grass collecting box 21.

At the other end part of the rotary shaft 28, there is provided the non-contact type rev-count sensor means 41, as seen in FIGS. 5 and 7. This rev-count sensor means 41 is formed as comprising a sensor mounting box 42 mounted to outer side of a side wall of the mown-grass collecting box 21, an approach sensor 43 mounted to the sensor mounting box 42, and a signaling plate 44 mounted to the other end of the rotary shaft 28. This rev-count sensor means 41 is so arranged that the signaling plate 44 is rotated together with the rotary shaft 28, and the rev-count of the signaling plate 44 is counted by the approach sensor 43 to sense the rev-count of the rotary shaft 28.

In this embodiment, there is provided a control circuit of rotary drive source for the rotary shaft. This control circuit comprises, as shown in FIG. 8, the non-contact type rev-count sensor means 41, and controller 45 connected to the approach sensor 43, the controller 45 being connected to the rotary drive source 29 for the rotary shaft 28. To the controller 45, as seen in FIG. 8, a power is supplied from a battery 2. In the rotary drive source control circuit, the rev-count of the rotary shaft 28 is preliminarily set in the controller 45, the rev-count of the rotary shaft 28 sensed by the approach sensor 43 of the rev-count sensor means 41 is transmitted to the controller 45, a stop signal is sent from the controller 45 to the rotary drive source 29 when the rev-count of the rotary shaft 28 sensed by the approach sensor 43 has reached the count set in the controller 45, the rotation of the rotary drive source 29 is stopped, the rotation of the rotary shaft 28 is stopped, and the rotation and movement of the first and second blades 31, 34 are stopped.

Next, the operation of the foregoing Embodiment 1 shall be described with reference to explanatory views of FIGS. 9 to 14.

In these FIGS. 9 to 14, a rotating trace of the first blade is shown by a chain-line circle 46 and the mown grass is shown by a shadowed zone G.

Now, in the present Embodiment 1, the mown-grass collecting bucket 20 is employed as mounted on the bucket mounting base 18 in the automatic lawn mower 1 (refer to FIG. 1). In dismounting the mown-grass collecting bucket 20 from the mounting base 18, a mounting and dismounting connector shown in FIG. 8 is cut, and the bucket can be easily dismounted from the base 18.

In collecting the mown grass into the mown-grass collecting box 21, the mown-grass collecting bucket 20 is mounted on the mounting base 18, and the discharge port 26 is kept closed by the first and second blades 31, 34 in the open state into the mountain shape. In this state, the grass G mown by the cutters 9 shown in FIG. 1 and flown up in the direction shown by the arrow 15 is allowed to enter through the intake port 22, and is collected inside the mown-grass collecting box 21 to be housed therein, by an action of the air flow path from the intake port 22 through the interior of the box 21 and away upward through the windows 23.

As the mown grass G of a predetermined amount is collected into the mown-grass collecting box 21, the box 21 is carried by means of the lawn mower shown in FIG. 1 to a mown-grass discharge site.

Figure 9:
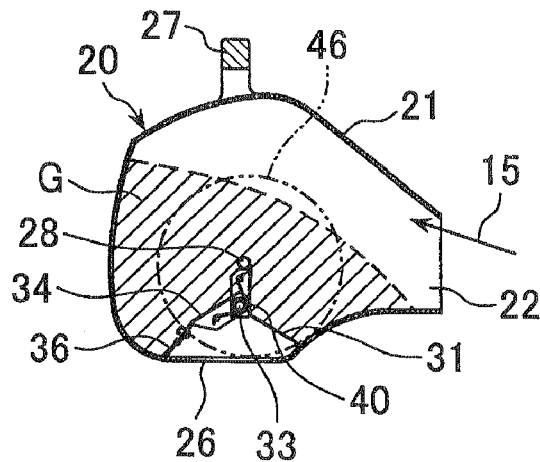
FIG. 9 is an explanatory view for an operation of the bucket in Embodiment 1.

At the discharge site, the rotary shaft 28 is rotated in counterclockwise direction from the state of FIG. 9 at a rate of about 1 rotation per 1 second, through the rotary drive source 29 and reduction means 30 shown in FIG. 5. As the rotary shaft 28 is rotated in this manner, the first and second blades 31, 34 are caused to rotate counterclockwise so as to open the mown-grass discharge port 26 as shown in FIG. 10, and the grass G in the mown-grass collecting box 21 is discharged through the poll 26 to the exterior.

Figure 10:
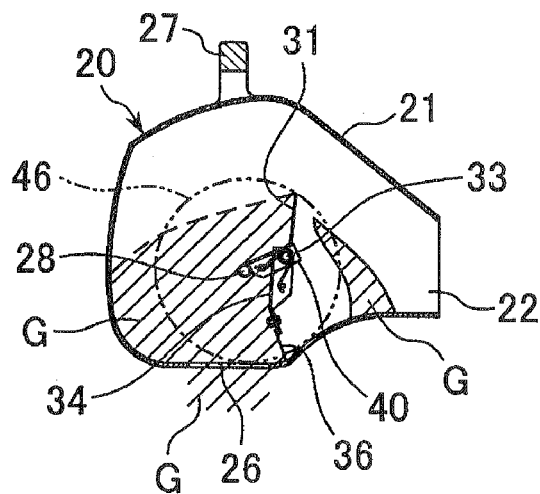
FIG. 10 is an explanatory view for an operation coming after the state of FIG. 9.
Figure 11:
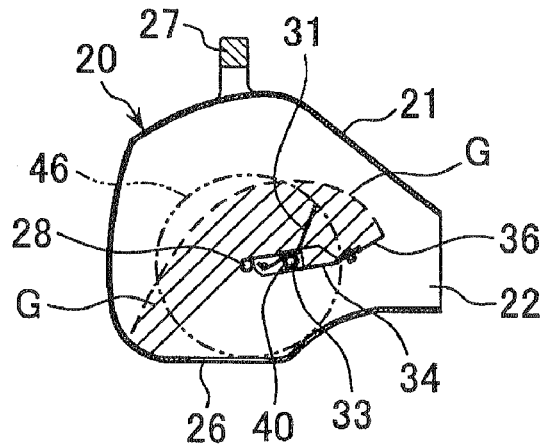
FIG. 11 is an explanatory view for an operation coming after the state of FIG. 10.

Then, as the rotary shaft 28 is rotated counterclockwise substantially by 90 degrees from the state of FIG. 10, the brush 36 provided to the second blade 34 scrapes up the mown grass G staying between the discharge port 26 and the intake port 22 in the box 21, and the grass is also scraped up by the second blade 34 and brash 36 as shown in FIG. 11.

Figure 12:
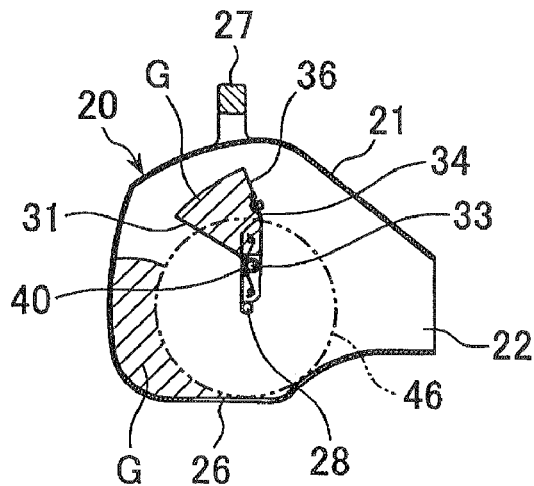
FIG. 12 is an explanatory view for an operation coming after the state of FIG. 11.

Then, as the rotary shaft 28 is rotated counterclockwise substantially by 90 degrees from the state of FIG. 11, as seen in FIG. 12, the grass G inside the box 21 is housed between the first and second blades 31, 34 and is led downward within the box 21.

Figure 13:
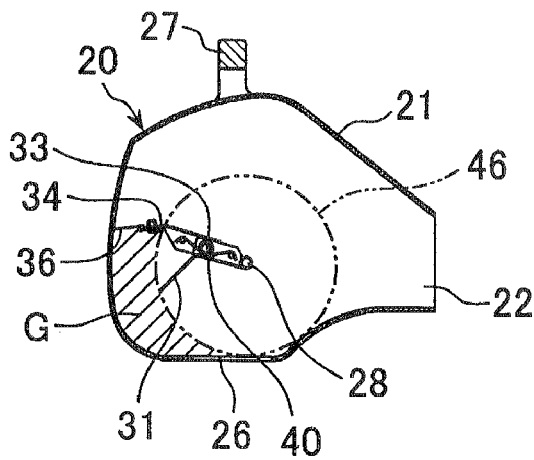
FIG. 13 is an explanatory view for an operation coming after the state of FIG. 12.

When the rotary shaft 28 is further rotated counterclockwise substantially by 90 degrees from the state of FIG. 12, the brush 36 provided to the second blade 34 comes in contact with the inner all of the box 21 and scrapes off any grass G sticking to the inner wall, as shown in FIG. 13. Further, as the brush 36 contacts frictionally with the inner wall of the box 21, the second blade 34 is caused by the friction force to get delayed from the first blade 31, so that an angle between the first and second blades 31, 34 will be gradually widened.

Figure 14:
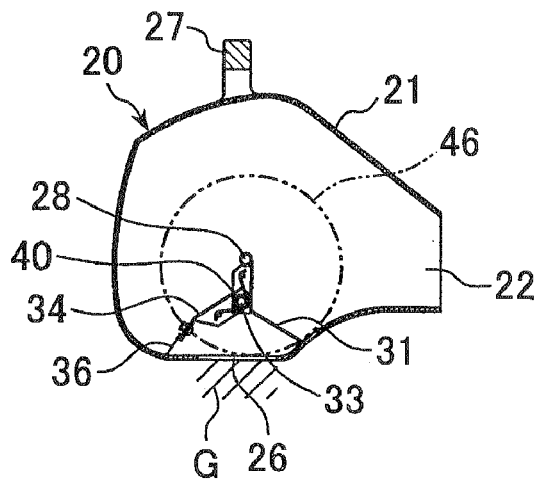
FIG. 14 is an explanatory view for an operation coming after the state of FIG. 13.

After that, the rotary shaft 28 is rotated counterclockwise by about 90 degrees from the state of FIG. 13, as seen in FIG. 14, the grass G scraped together by the brush 36 is discharged out of the discharge port 26.

With the foregoing discharge of the mown grass, one cycle of the mown-grass discharge from the interior of the mown-grass collecting box 21 is terminated.

Then, in this Embodiment 1, the rev-count of the rotary shaft 28 is constantly sensed by the non-contacting type rev-count sensor means 41 shown in FIGS. 7 and 8, and thus sensed rev-count is transmitted to the controller 45 provided in the rotary drive source controlling circuit.

In the controller 45, 4 rotations or the like, for example, sill be set as the rev-count of the rotary shaft which has been obtained through preliminary experiments. Then, at the controller 45, the rev-count of the rotary shaft provided from the rev-count sensing means 41 is compared with the set value of the rev-count, the stop signal is transmitted to the rotary drive source 29 of the rotary shaft when the sensed rev-count has reached the set count, so as to stop the rotary drive source 29 to stop the rotation of the rotary shaft 28, and the rotation and movement of the first and second blades 31, 34 attached to the rotary shaft 28 are ceased.

According to Embodiment 1 of the present invention as described above, the mown-grass intake port 22 is provided at the position of the mown-grass collecting box 21, which position corresponding to the lawn mower's cutters 9, the discharge port 26 is provided at the lower position of the box 21, and, in collecting the mown grass into the box 21, the mown-grass discharge port 26 is kept closed by means of the first and second blade 31, 34 opened in the mountain shape, so that the mown grass G caused to fly from the side of the cutters 9 can be collected in smooth manner to be housed within the mown-grass collecting box 21.

According to this Embodiment 1, further, the windows 23 are formed in the upper part of the mown-grass collecting box 21, the metal afire net or the perforated metal plate 24 is mounted to the windows 23, and the air flow path 25 flowing from the mown-grass intake port 22 through the interior of the box 21 towards the exterior, so that the mown grass from the side of the cutters 9 can be more smoothly collected by means of the action of the air flowing through the path 25.

Further according to this Embodiment 1, as the rotary shaft 28 is rotated in discharging the mown grass to have the first and second blades 31, 34 rotated and moved from the mown-grass discharge poll 26 through the intake port 22 to the discharge port 26, during the process of which movement the brush 36 provided to the tip edge of the second blade 34 comes into contact frictionally with the inner wall of the mown-grass collecting box 21 to scrape together the mown grass G sticking to the inner wall, and the mown grass G is led towards the discharge port 26 by means of the second blade 34 and brush 36, and then the discharge port 26 is opened to have the grass discharged out of the port 26, so that the mown grass G collected within the box 21 can be scraped together and automatically discharged to the exterior of the box 21. As a result, the lawn-treating operator can be relieved from the heave work.

Further according to this Embodiment 1, as the set value with respect to the rev-count of the rotary shaft and obtained through the preliminary experiments is set in the controller 45 of the rotary drive source controlling circuit, the rev-count of the rotary shaft 28 is sensed by means of the rev-count sensing means 41 for the rotary shaft, the sensed rev-count is transmitted to the controller 45, to have the sensed rev-count of the rotary shaft compared in the controller 45 with the set value of the rev-count of the rotary shaft, the stop signal is sent from the controller 45 to the rotary drive source 29 to stop the source 29, so as to stop the rotation of the rotary shaft 28 for having the rotation and movement of the first and second blades 31, 34 stopped, so that, in discharging the mown grass, the rotary shaft 28 can be controlled at the preliminarily set rev-count, the first and second blades 31, 34 attached to the rotary shaft 28 are properly controlled, and the mown grass G collected within the mown-grass collecting box 21 can be clearly and effectively discharged.

Next, Embodiment 2 of the present invention shall be described with reference to FIG. 15 of a vertically sectioned side elevation.

Figure 15:
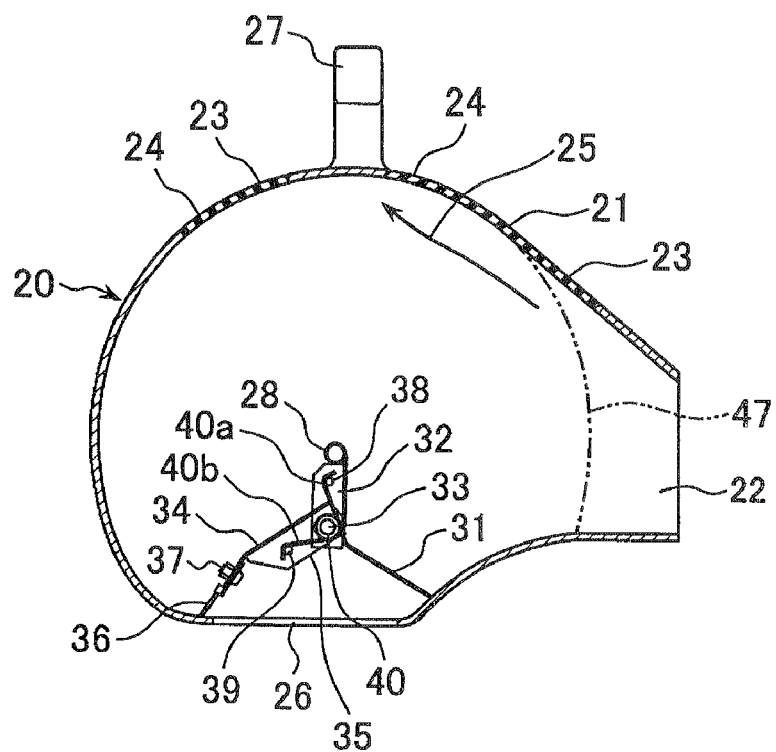
FIG. 15 shows a vertically sectioned view of the bucket in Embodiment 2 of the present invention.

In Embodiment 2 shown in FIG. 15, a rotational trace of the brush 36 provided to the second blade 34 is shown by means of a chain line 47.

Here, in Embodiment 2, the shape of the mown-grass collecting box 21 is so formed that the tip end of the brush 36 provided to the second blade 34 will contact with the inner wall of the box 21 from a position close to the intake port 22.

Therefore, according to Embodiment 2, it is possible to scrape off any mown grass sticking to the inner wall of the mown-grass collecting box 21 from the position close to the intake port 22, where the tip end of the brush 36 contacts.

Other arrangement and operation of this Embodiment 2 are the same as those in the foregoing Embodiment 1.

Figure 16:
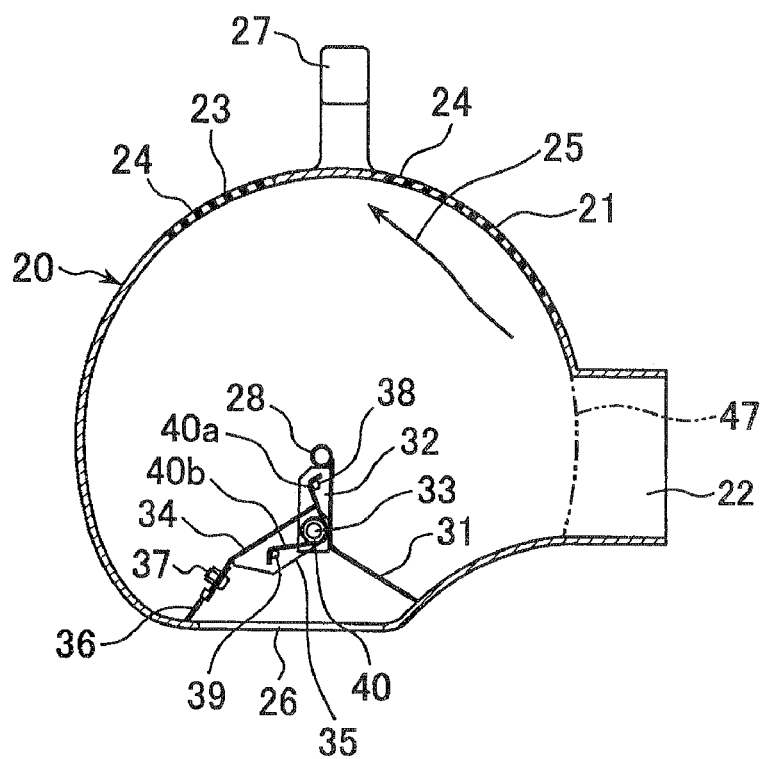
FIG. 16 shows a vertically sectioned view of the bucket in Embodiment 3 of the present invention.

Now, Embodiment 3 of the present invention shall be described with reference to FIG. 16 showing a vertically sectioned side elevation.

In this Embodiment 3 shown in FIG. 16, the mown-grass intake port 22 is formed in a sleeve type, and the brush 36 provided to the second blade 34 is made to engage the inner wall of the mown-grass collecting box 21 immediately ashen tip end of the brush goes beyond the intake port 22, so as to be able to scrape off the mown grass sticking to the wall.

Other arrangement and operation of this Embodiment 3 are the same as those in the foregoing Embodiment 1.

Figure 17:
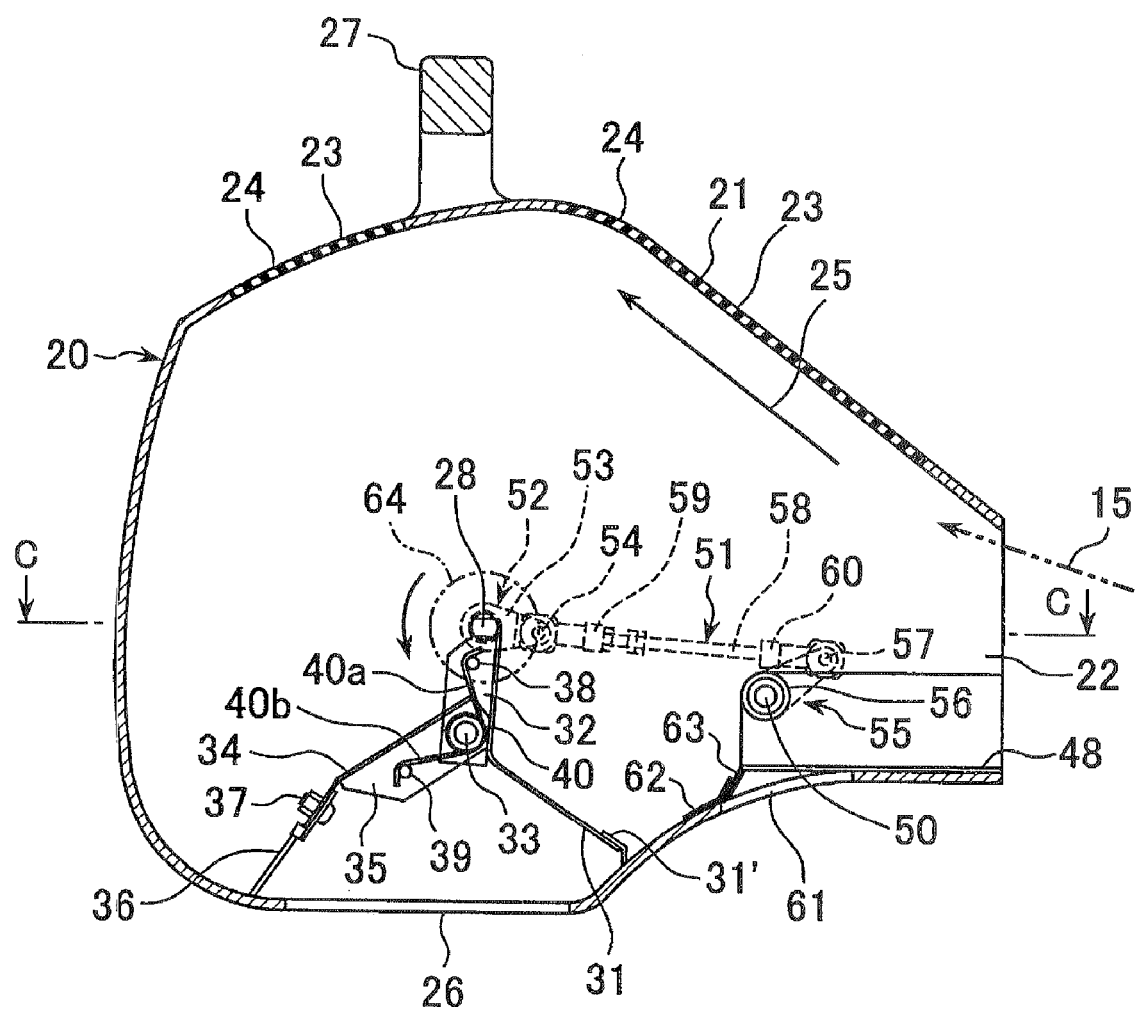
FIG. 17 shows a vertically sectioned view of the bucket in Embodiment 4 of the present invention, in a state where the mown grass is being collected.
Figure 18:
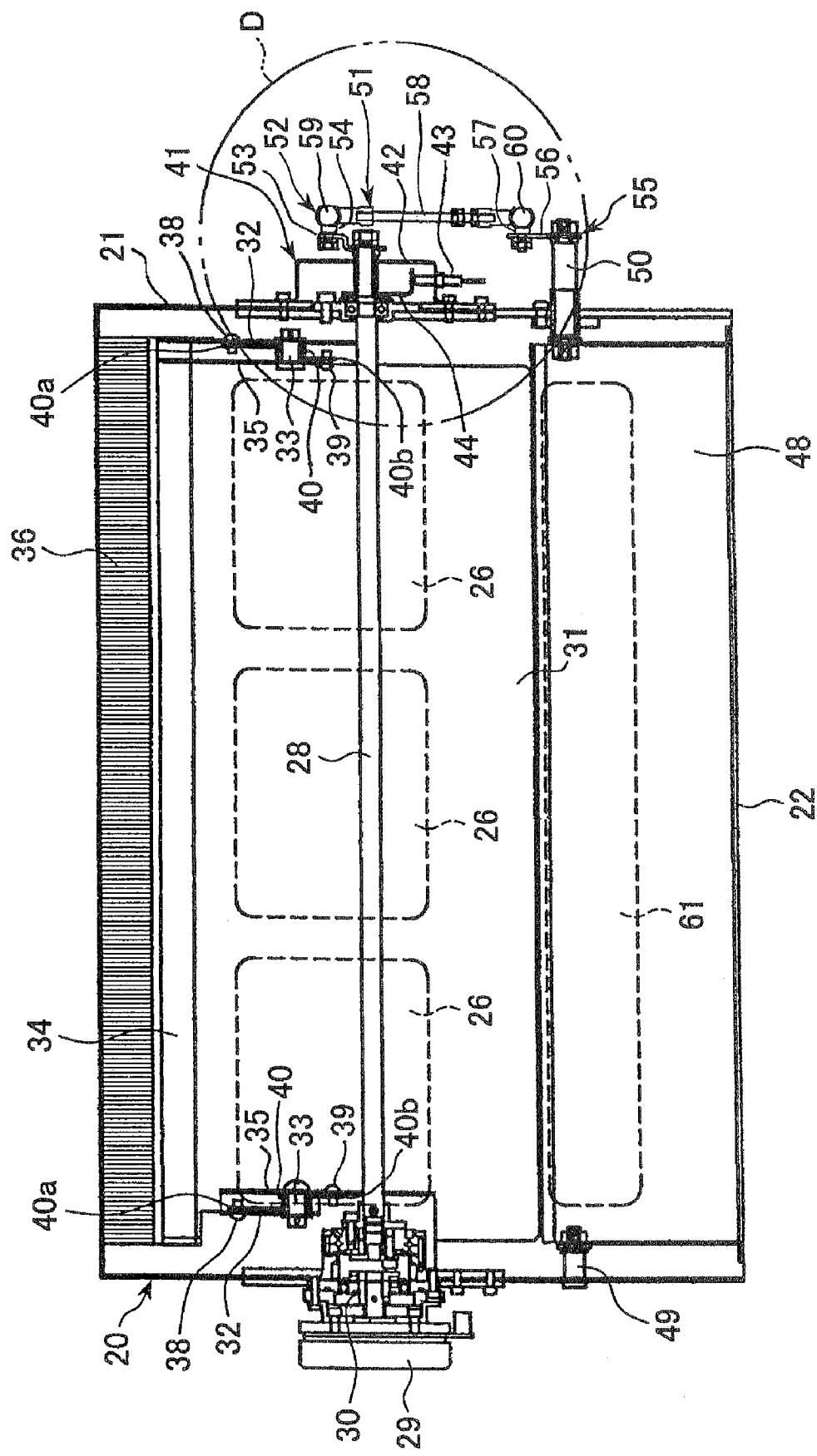
FIG. 18 shows a cross-sectional view of the bucket along a line C-C in FIG. 17.
Figure 19:
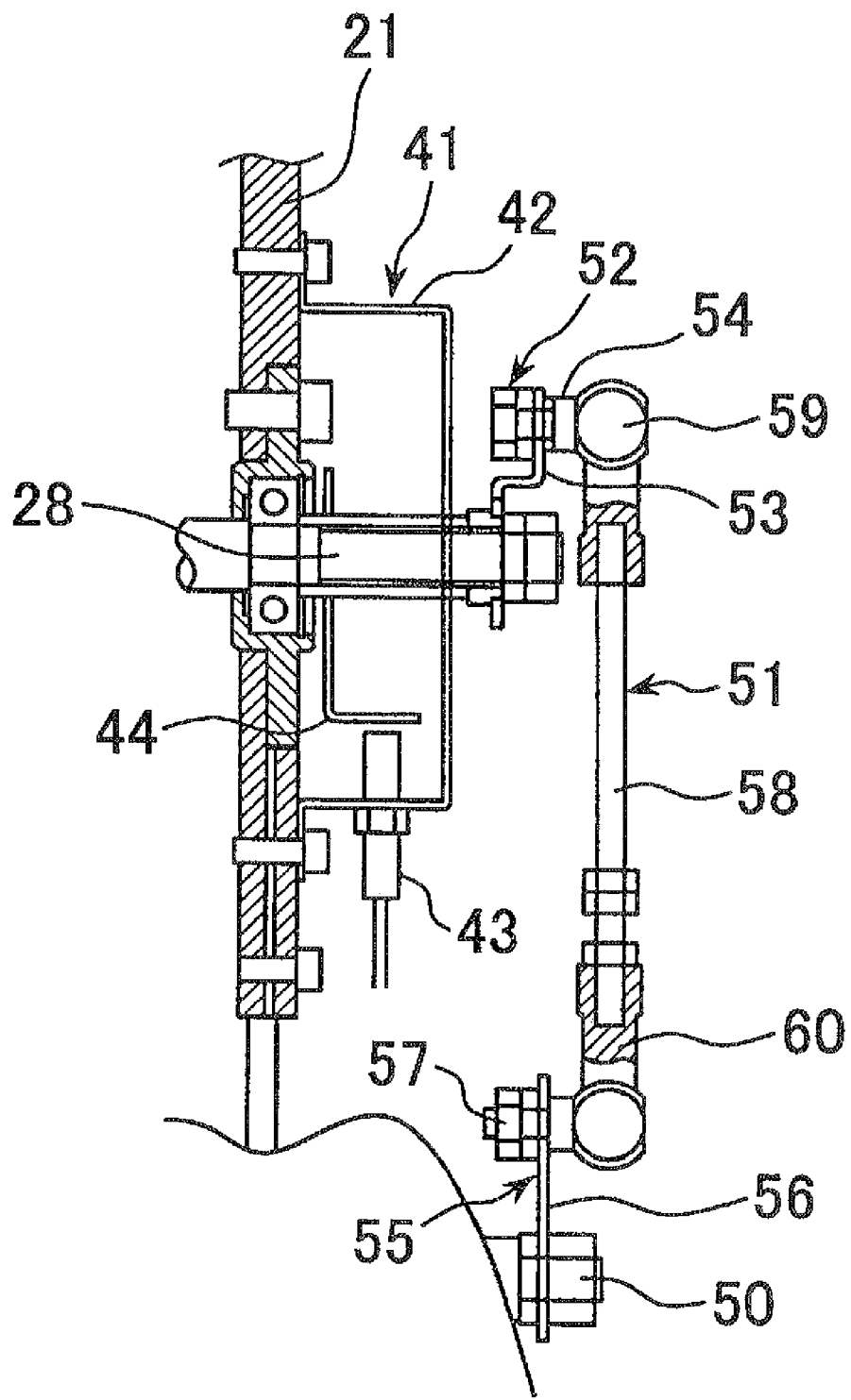
FIG. 19 is a fragmentary sectioned view as magnified at a portion encircled by D in FIG. 18.
Figure 20:
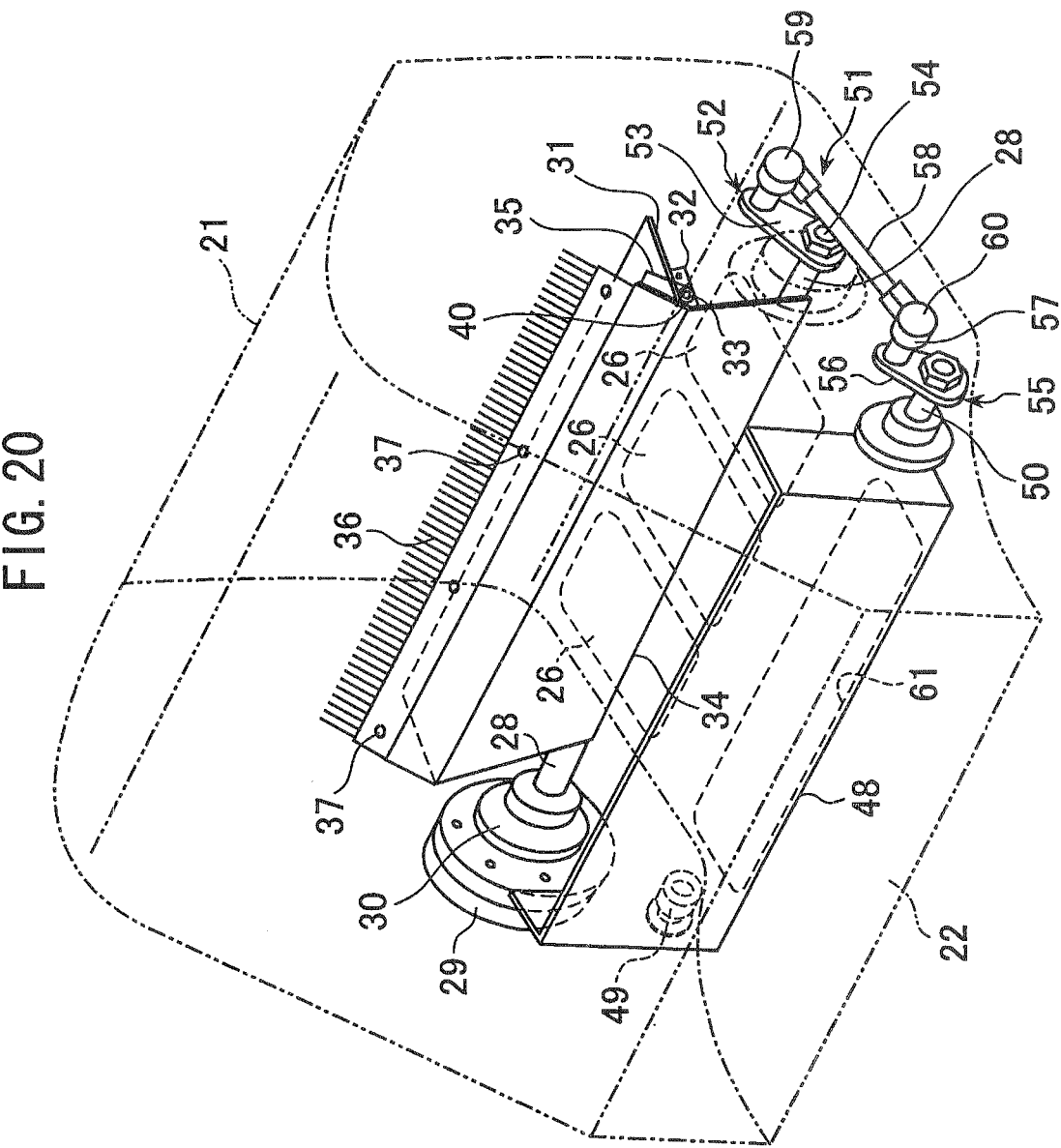
FIG. 20 shows a perspective view as magnified of essential components of the bucket in Embodiment 4.
Figure 21:
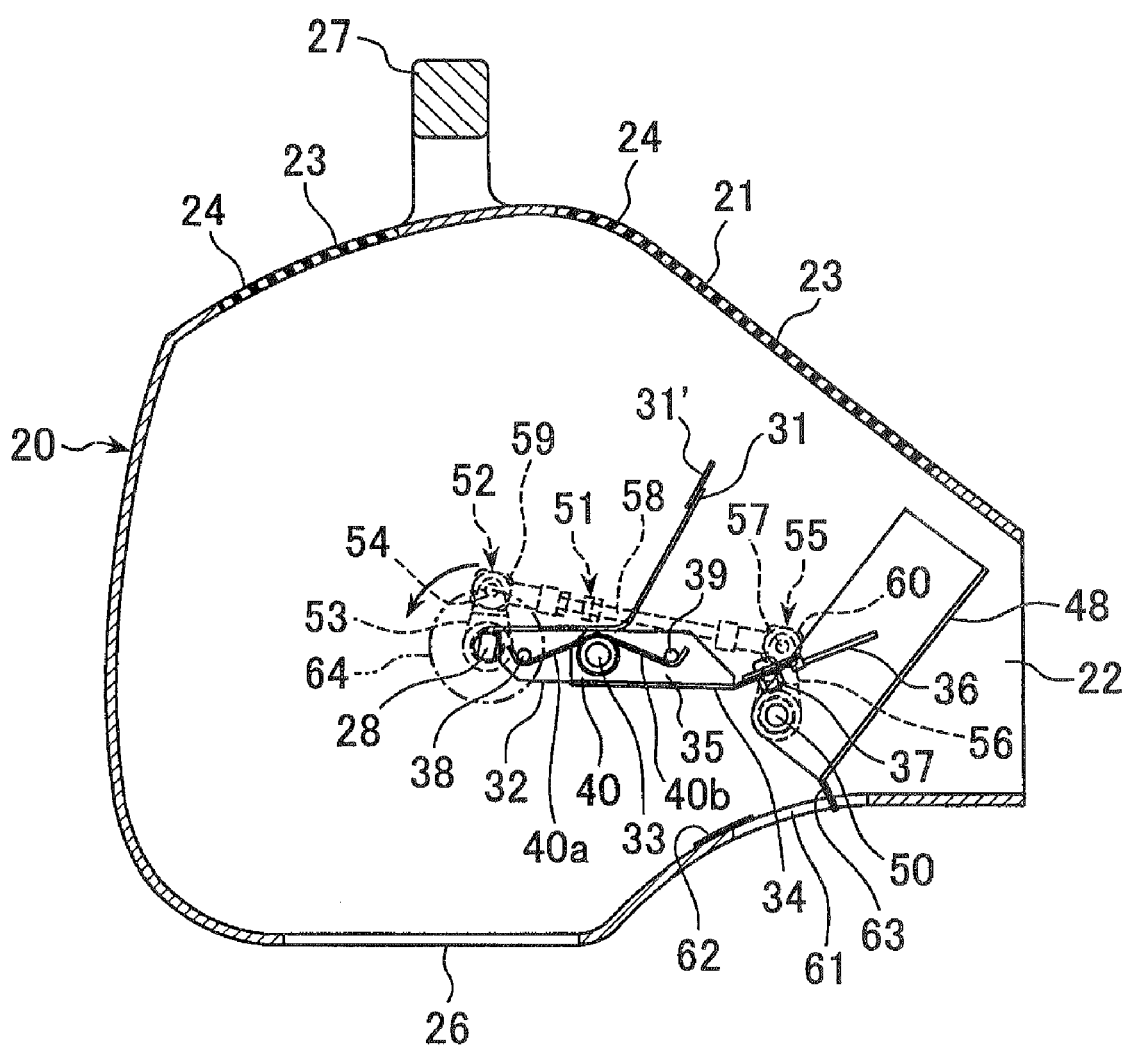
FIG. 21 is a vertically sectioned view of the bucket in Embodiment 4 in a state where a stop plate erected for stopping the grass driven back.

In FIGS. 17 to 21, there is shown Embodiment 4 of the present invention, wherein FIG. 17 is a vertically sectioned side elevation of the mown-grass collecting bucket 20 in Embodiment 4 in its state of collecting the mown grass, FIG. 18 is a line C-C section of the bucket in FIG. 17, FIG. 19 is a fragmentary section as magnified at encircled portion D in FIG. 18, FIG. 20 shows in a perspective view essential components or the bucket in Embodiment 4 as magnified, and FIG. 21 is a vertically sectioned side elevation of the bucket in a state where the stop plate for jumping-up grass is erected.

In this Embodiment 4 of the present invention shown in FIGS. 17 to 21, the first blade 31 is provided at its tip edge with a seal element 31' made of an elastic sheet.

Further, the stop plate 48 for jumping-up mown grass is disposed inside the mown-grass intake port 22. This stop plate 48 is formed in U-shape in section. Further, this stop plate 48 is rotatably supported by side walls of the mown-grass intake port 22 through pivot shafts 49, 50 provided to both end parts in longitudinal direction of the plate, as shown in FIGS. 18 and 20.

The stop plate 48 is coupled to the rotary shaft 28 to be driven thereby through an operating means 51 for the stop plate, which means is constituted by linking between a drive crank 52 and a driven crank 55 with a link rod 58. The drive crank 52 comprises the rotary shaft 28 as a crank shaft, a crank arm 53 mounted on the shaft 28, and a crank pin 54 provided at a tip end of the crank arm 53. On the other hand the driven crank 55 comprises the pivot shaft 50 as a crank shaft, a crank arm 56 mounted to the shaft 50, and a crank pin 57 provided at a tip end of the crank arm 56. The link rod 58 is linked at one end through a rod end bearing 59 to the crank pin 54 of the drive crank 52, and at the other end through a rod end bearing 60 to the crank pin 57. Thus, the operating means 51 for the stop plate operates to attain a substantially horizontally lie down state of the stop plate 48 as shown in FIG. 17, and to attain an erected state at an angle capable of stopping the jumping up mown grass as shown in FIG. 21, by means of the rotational driving of the rotary shaft 28 in one direction, which causing the drive crank 52 to perform a crank motion which is transmitted through the link rod 58 to the driven crank 55, whereby the driven crank 55 is caused to perform a crank motion.

In the drawings showing this Embodiment 4, moving trace of the crank pin 54 of the drive crank 52 is shown by chain-line circle 64. In a position corresponding to the stop plate 48 inside the mown-grass intake port 22, a grass discharge hole 61 is provided for the grass stopped by the stop plate 48 and falling down.

At an end of the discharge hole 61 on the side of the discharge port 26, a seal element 62 is provided, while the stop plate 48 is provided on an end side facing the discharge hole 61 with bent fin 63. The seal element 62 is fabricated with an elastic sheet, and the bent fin 63 is formed by bending part of the stop plate 48. The seal element 62 and bent fin 63 are overlapping each other so as to seal any gap between the discharge hole 61 and the stop plate 48 during the mown grass collection into the box 21.

In this Embodiment 4, the mown-grass discharge port 26 is closed by the first and second blades 31, 34 which are opened in the mountain shape as shown in FIG. 7, at the time of the mown-grass collection into the box 21. At this time, the seal member 31' provided at tip edge of the first blade 31 and the brush 36 provided at the tip edge of the second blade 34 are made to closely engage the inner wall of the mown-grass collecting box 21, to cover the discharge port 26. In such mown-grass collection into the box 21, the stop plate 48 is made to lie down substantially in horizontal state by the operating means 51, as shown in FIG. 17, to be set in a posture of eliminating any trouble in the collection from the intake port 22.

In the state where the stop plate 48 is laid substantially horizontal as has been described, the gap between the mown grass discharge hole 61 and the stop plate 48 is sealed by means of the seal member 62 and bent fin 63.

In the state where the respective components are set as shown in FIG. 17, the mown grass G is collected through the intake port 22 and housed in the mown-grass collecting box 21.

Next, FIGS. 22 to 26 are explanatory views for the operation in discharging the mown grass in this Embodiment 4.

Figure 22:
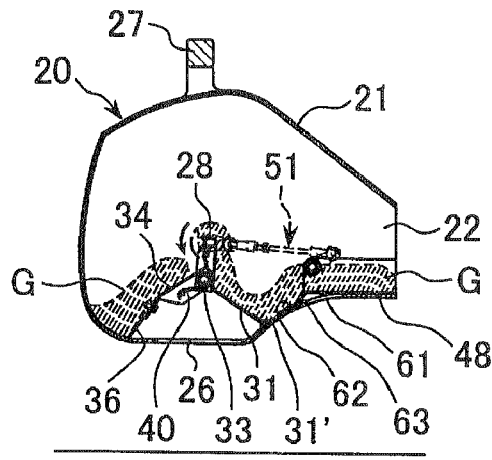
FIG. 22 is an explanatory view for an operation in Embodiment 4.

In this Embodiment 4, too, after collecting a predetermined amount of the mown grass into the mown-grass collecting box 21 as shown in FIG. 22, the box 21 is transported by the automatic labia mower 1 shown in FIG. 1 to the mown grass discharge site.

Figure 23:
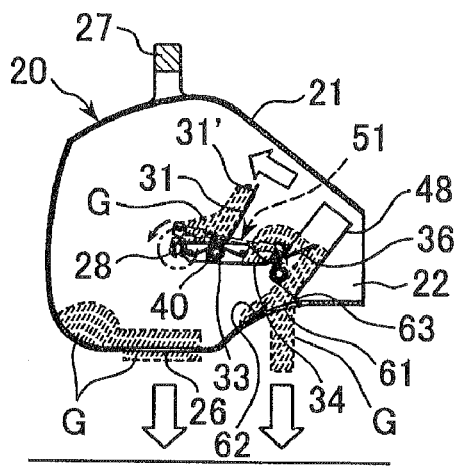
FIG. 23 is an explanatory view for an operation coming after the state of FIG. 22.

At the mown grass discharge site, the rotary shaft 28 is rotated counterclockwise substantially 90 degrees from the state of FIG. 22, then the first and second blades 31, 34 are caused to open the mown grass discharge port 26 as shown in FIG. 23 and, next, to move to the position of the mown-grass intake port 22. As the discharge port 26 is opened, the mown grass G within the mown-grass collecting box 21 is discharged through the discharge port 26 to the exterior.

Further, at the same time when the rotary shaft 28 rotates counterclockwise substantially 90 degrees from the state of FIG. 22, the drive crank 52 of the stop-plate operating means 51 makes its crank motion, which motion is transmitted through the link rod 58 to the driven crank 55 to cause it to perform the crank motion, the stop plate 48 is erected from the lie down state to an angle capable or stopping the moon grass, and at the same time the mown grass discharge hole 61 is opened.

Now, in the process where the first and second blades 31, 34 are moving from the position of the mown-grass discharge port 26 towards the intake port 22, some mown grass sticking to or staying around the inner wall between the discharge port 26 and the intake port 22 is happened to be hit by the first and second blades 31, 34 to fly towards the intake port 22. At this moment, in Embodiment 4, the stop plate 48 is erected and the mown grass discharge hole 61 is opened, so that the mown grass G hit to fly towards the intake port 22 is stopped by the stop plate 48 to fall down and is automatically discharged through the discharge hole 61 to the exterior of the box 21.

Figure 24:
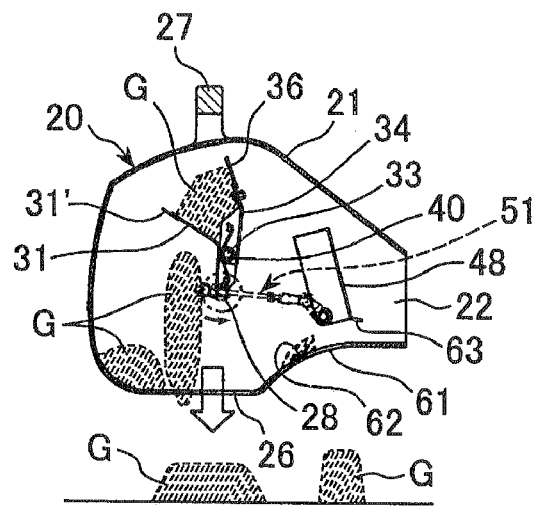
FIG. 24 is an explanatory view for an operation coming after the state of FIG. 23.
Figure 25:
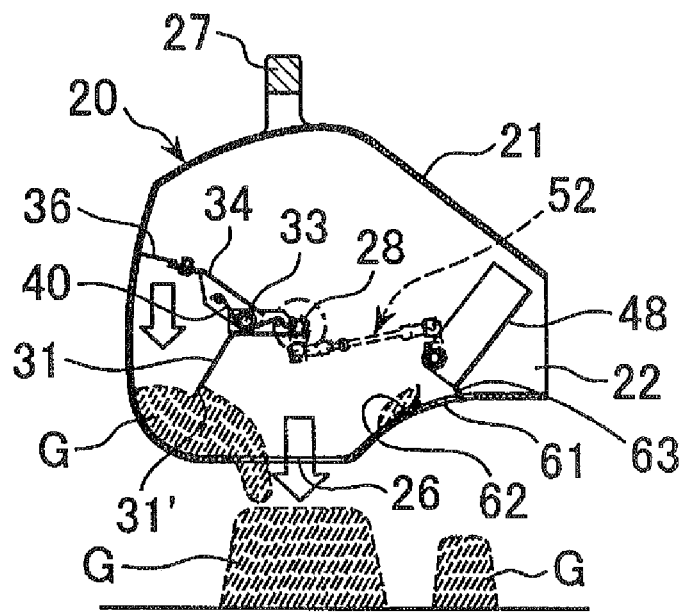
FIG. 25 is an explanatory view for an operation coming after the state of FIG. 24.

As the rotary, shaft 28 rotates counterclockwise substantially 90 degrees from the state of FIG. 23 and further counterclockwise substantially 90 degrees from the state of FIG. 24, the mown grass G within the collecting box 21 is carried by the first and second blades 31, 34 towards the discharge port 26, as seen in FIGS. 23 to 25. During this time, the stop plate 48 is operated from the erected state shown in FIG. 23 to the state tilted to inner side of the box 21 as shown in FIG. 24 by the operating means 5, and is then made to shift to a state tilted onto the side of the mown-grass intake port 22 as shown in FIG. 25.

In the process of further rotation of the rotary shaft 28 from the state of FIG. 25 substantially 90 degrees in counterclockwise direction, the brush 36 provided to the second blade 34 comes into contact frictionally with the inner wall of the mown-grass collecting box 21, to scrape off any mown grass G sticking to the inner wall of the box, and leads such grass towards the discharge port 26. Further, due to the frictional force between the inner wall of the box 21 and the brush 36, the second blade 34 is caused to move as delayed with respect to the first blade 31, and the angle between the first and second blades 31, 34 is caused to gradually expand.

Figure 26:
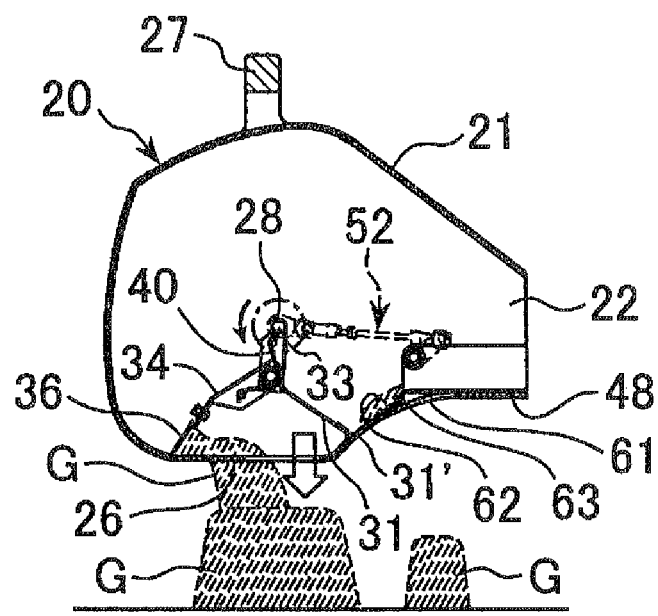
FIG. 26 is an explanatory view for an operation coming after the state of FIG. 25.

Then, as the rotary, shaft 28 attains one counterclockwise rotation from the state of FIG. 22, the mown grass G scraped off by the brush 36 provided to the second blade 34 and led to the position of the discharge port 26 is discharged through the discharge port 26 to the exterior of the box 21, as shown in FIG. 26. Further, the stop plate 48 for the jump-up mown grass is caused to lie down substantially horizontal as shown in FIG. 26 by the operating means 51 therefor.

In this Embodiment 4, too, the rotary shaft 28 is operated to rotate, at the mown grass discharge site, until the set rev-count in the controller 45 of the rotary drive source control circuit shown in FIG. 8 is reached, and the discharge operation for the mown grass G in the mown-grass collecting box 21 is performed repeatedly.

According to Embodiment 4 of the present invention as has been described, the stop plate 48 for jumping-up mown grass is disposed inside the mown-grass intake port 22, this stop plate 48 is rotatably supported through the pivot shafts 49, 50 to the side walls of the intake port 22, the rotary shaft 28 and pivot shaft 50 for the stop plate 48 are coupled by means of the operating means 51 for the stop plate, so that, in discharging the mown grass, the stop plate 48 is made to be erected at the angle capable of stopping the mown grass by means of the operating means 51 for the stop plate, when the first and second blades 31, 34 rotate and move towards the intake port 22 from the mown-grass discharge port 26. Thus, even when the mown grass G sticking to or staying around the zone between the discharge port 26 and the intake port 22 inside the mown-grass collecting box 21 is hit to fly towards the intake port 22 by the seat member 31' provided to the first blade 31 and the brush 36 provided to the second blade 34, such flying mown grass G will be received by the stop plate 48, so that any trouble that the mown grass hit to fly towards the intake port 22 will directly jump out of the intake port 22 can be prevented from occurring.

Further according to this Embodiment 4, since the seal member 31' is provided to the tip edge of the first blade 31, the seal member 62 is provided to the end on the side of the discharge port 26 in the discharge hole 61, and such seal member as a bent fin 63 is provided to the end of the stop plate 48 on the side facing the discharge hole 61 so that, in collecting the mown grass, the seal member 31' provided to the tip edge of the first blade 31 and the brush 36 provided to the tip edge of the second blade 34, both plate 31 and 34 being opened in the mountain shape, are in close contact with the inner wall of the mown-grass collecting box 21 so as to cover the discharge port 26, and, also in collecting the mown grass, the seal member 62 and bent fin 63 are overlapping each other so as to seal ants gap between the discharge hole 61 and the stop plate 48, so that it is possible to prevent such trouble that the mown grass G collected inside the mown-grass collecting box 21 scatters out of the discharge port 26 and discharge hole 61.

Further, other arrangement and operation in respect of Embodiment 4 are the same as those in the foregoing Embodiment 1.

I claim:

1. A mown-grass collecting bucket characterized in that a hollow mown-grass collecting box (21) is provided at a position corresponding to a cutter side of a lawn mower with a mown-grass intake port (22) and at a lower portion of the box (21) with a mown-grass discharge port (26), and there is provided in the mown-grass collecting box (21) a mown-grass collecting and discharging mechanism, wherein the mechanism is for closing the discharge port (26) when the mown grass is collected into the collecting box (21) with first and second blades (31, 34) kept open in a mountain-shape by means of a rotary shaft (28) linked with a rotary drive source (29) to be driven thereby, the first blade (31) mounted through a pair of first brackets (32) to the rotary shaft (28) for integral rotation therewith, the second blade (34) supported through a pair of second brackets (35) by support shafts (33) to be rotatable thereabout and having at tip edge a brush (36), the support shafts (33) being provided on the first brackets (32) and a pair of twist springs (40) respectively mounted on each support shaft (33) and across each first bracket (32) for one end of the twist spring and on each second bracket (35) for the other end of the spring, wherein the one end (40a) of the twist spring is locked to each first bracket (32) and the other end (40b) of the twist spring is locked to each second bracket (35), wherein with an action of the mounted twist springs (40), the first and second blades (31, 34) are set in a state where the blades are opened at a predetermined angle;

wherein the mown grass is discharged while the first and second blades (31, 34) are rotated and moved from the discharge port (26), in order to open the discharge port, through the intake port (22) back to the discharge port (26), with the brush (36) at the tip edge of the second blade (34) made to scrape together the mown grass within the box (21) to lead it to the position of the discharge port (26) opened for discharge the grass thereout.

2. The mown-grass collecting bucket set forth in claim 1, characterized in that a rotary drive source control circuit is constituted such that the rotary shaft (28) is provided with a non-contacting type rev-count sensor means (41), which sensor means (41) is connected to a controller (45) connected to the rotary drive source (29) of the rotary shaft (28), so that, when the rev-count of the rotary shaft (28) as sensed by the rev-count sensor means (41) has reached a count preliminarily set in the controller (45), the rotary drive source (29) is stopped.

3. The mown-grass collecting bucket set forth in claim 1, characterized in that a stop plate (48) for jumping, up grass is provided at a lower position inside the mown-grass intake port (22), the stop plate (48) is supported rotatable to side walls of the intake port (22) through pivot shafts (49, 50), and the stop plate (48) is linked to an operating means (51) provided between the rotary shaft (28) and one pivot shaft (50) for causing the stop plate (48) to lie down substantially horizontally when the mown grass is collected into the mown-grass collecting box (21), and for causing the stop plate (48) to be erected at an angle capable of stopping any jumping up grass when the second blade (34) rotates to move from the discharge port (26) towards the intake port (22) at the time of discharging the mown grass.

4. The mown-grass collecting bucket set forth in claim 3, characterized in that a discharge hole (61) is provided at a position corresponding to the stop plate (48) at the lower position of the mown-grass intake port (22), for the grass falling down as stopped by the stop plate (48).

* * * * *